Nov. 14, 1939.  G. R. DEMPSTER  2,179,778
TRANSPORTING VEHICLE
Filed June 17, 1938  2 Sheets-Sheet 1
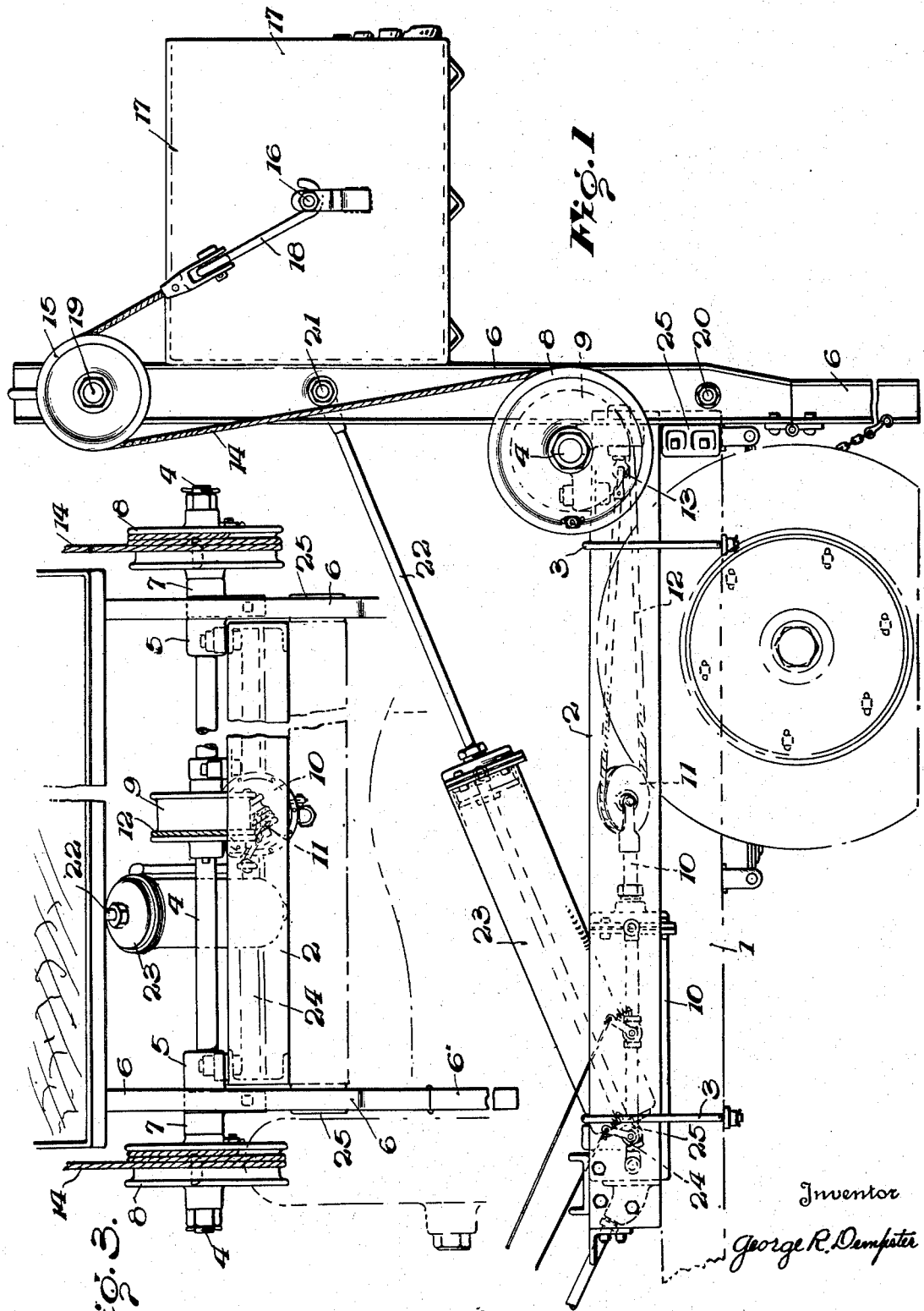
Inventor
George R. Dempster
By Cameron, Kerkam + Sutton
Attorneys

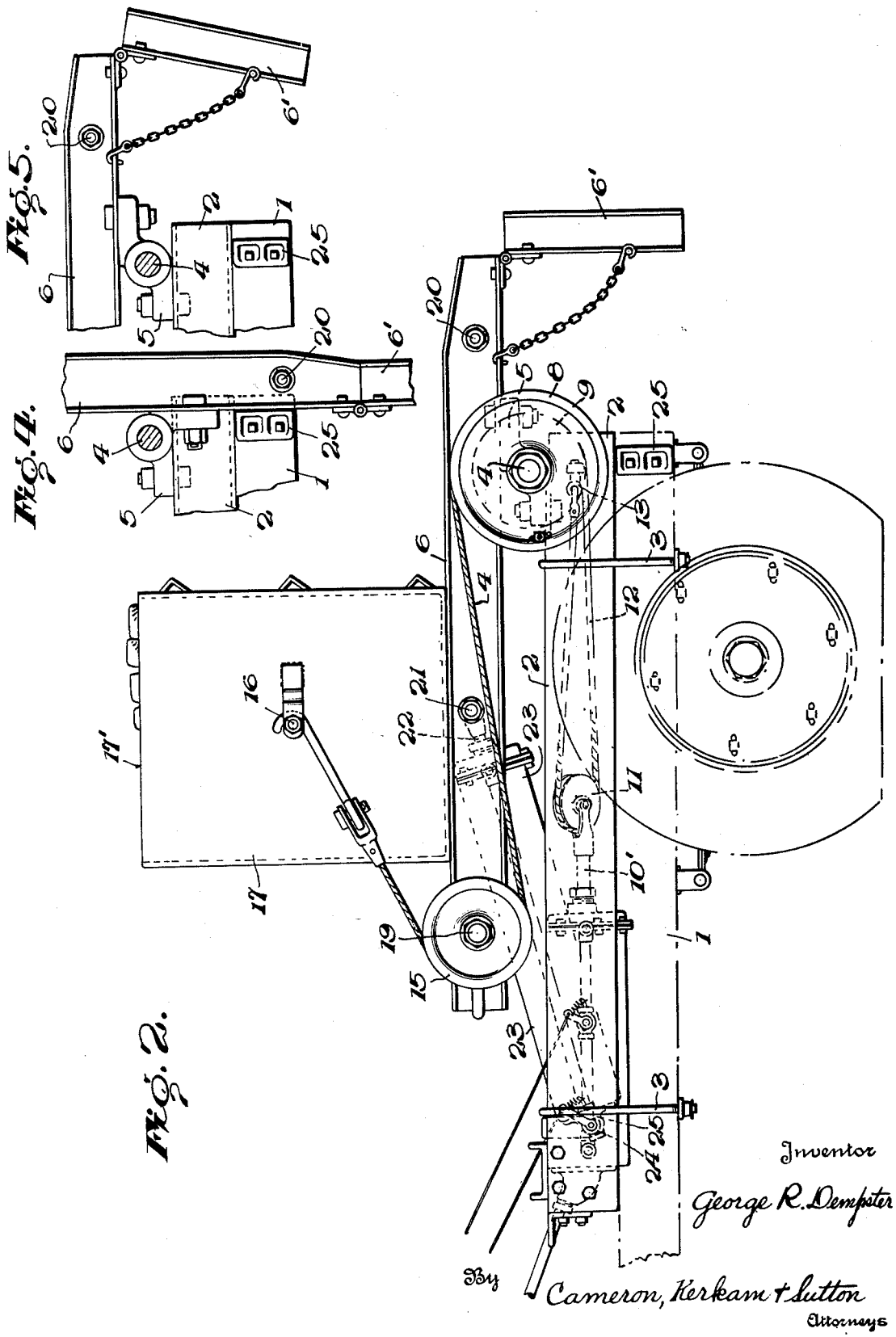

Patented Nov. 14, 1939

2,179,778

UNITED STATES PATENT OFFICE 2,179,778

TRANSPORTING VEHICLE

George R. Dempster, Knoxville, Tenn.

Application June 17, 1938, Serial No. 214,371

2 Claims. (Cl. 214—75)

This invention relates to transporting vehicles and more particularly to that class of transporting vehicles wherein the load is carried in a container, transported to its destination and then either dumped from the container, or the container, with the contained load is deposited on the ground.

In transporting vehicles of this class it has heretofore been proposed to elevate and support a detachable container along a track or way mounted on the frame of the vehicle well to the rear of the axle thereof. The material with which the container is loaded is frequently of great weight, such for example, as stone or brick, and the presence of this great weight during transportation to the rear of the rear axle of the vehicle places an undesirable strain upon the structure.

The object of this invention is to provide a vehicle having an upwardly extending track or way pivoted on the vehicle to turn in a vertical plane and means for elevating a loaded container up said track or way, together with power means for turning said track or way around its pivot to the end that the container may be deposited upon the chassis of the framework of the vehicle over or well forward of the rear axle of the vehicle.

The inventive idea is capable of receiving a variety of mechanical expressions, one of which for the purpose of illustrating the invention is shown in the accompanying drawings, but it is to be expressly understood that such drawings are for the purpose of illustration only and are not designed to define the limits of the invention, reference being had to the appended claims for this purpose.

In said drawings—

Fig. 1 represents a side elevation of a rear portion of a truck having a track or way pivoted thereto and a container resting against said track or way in a horizontal plane well above the rear axle of the truck;

Fig. 2 is a side elevation showing the track or way and its supported container turned downwardly and forwardly from the position shown in Fig. 1, with the container resting in a plane above the rear axle of the vehicle and substantially in front thereof;

Fig. 3 is a broken detail plan view of part of the operating mechanism;

Fig. 4 is a broken detail in elevation illustrating the manner of pivoting the track or way to the vehicle and with the track or way extending upwardly; and Fig. 5 is a view similar to Fig. 4 showing the track or way turned down into approximately horizontal position.

Referring to the drawings, in which like reference numerals indicate like parts throughout the several views, 1 indicates the rear end of the frame or chassis of a truck with the end thereof extending out beyond the rear wheel of the truck, it being understood that there are two of such parts of the frame 1, one on either side of the truck, and 2 indicates suitable rails or bars, preferably in the form of angle bars attached as by clamps 3—3 above the side frames 1, the ends of the bars 2 extending to the rear approximately the same distance as the frame bars 1. 4 is a shaft extending across the rear of the vehicle from side to side and with its ends projecting outward beyond the bars 2 (as shown in Fig. 3), said shaft being mounted to turn in bearings 5 formed on or bolted to the rear ends of the bars 2. Two rails 6 of the track or way are hinged to turn around the shaft 4 (see Figs. 4 and 5) and are each provided with a downward extension 6' of a length to reach the ground when the rails 6 are upright. It will thus be seen that the track or way, composed of the rail bars 6, may be turned forwardly around the shaft 4 from an upwardly extending and approximately upright position into an approximately horizontal position, as shown in Figs. 2 and 5. The bottoms of the rails 6, 6, constituting the track or way, are held between the bearing part 5 and a washer 7 (Fig. 3) between the respective rails and a drum 8 keyed to the shaft 4. Between the two rails 6, 6, there is keyed onto the shaft 4 a drum 9, preferably of less diameter than the two drums 8.

Mounted within the framework of the truck forward of the track or way is a cylinder 10, the rearwardly projecting piston rod 10' of which bears a pulley 11 around which passes a cable 12, one end of which is fixedly secured, as at 13, to the frame of the machine well to the rear of the piston 10. The cable 12 after passing around the pulley 11 passes to and is wound around the drum 9. Means are provided for supplying fluid under pressure to either side of the piston 10 as desired, and under control of the operator of the machine, said fluid pressure being preferably derived from the truck motor. By this means the shaft 4 and with it the drums 8 and 9 are rotated. Cables 14 are wound on the drums 8 and extend upward therefrom over guide sheaves 15 turning on shaft 19 and then downward and rearward to any suitable point as at 16, where they are connected to the container 17, preferably by means of a detachable connection, such as hooks 18. The shaft 19 extends across between the rails of the track or way, the guide sheaves being outside of the respective rails. If desired the lower ends of the rails 6, 6 of the track or way may also be connected by a rod 20 extending between the rails of the track and near the bottom thereof. By this means there is provided a rigid track or way normally extending upwardly on the rear of the truck and capable of a pivotal action, whereby the entire track or way may be moved downward from its upright position and in a vertical plane extending forwardly from the rear of the truck and toward the forward portion thereof. For the purpose of effecting this movement, the rails of the track or way have a rod 21 extending from one rail to the other, and pivotally connected to this rod 21 is a piston rod 22 connected to a piston in the cylinder 23. This cylinder is pivoted at 24 to any suitable part of the truck frame and well forward of the track or way. Fluid under pressure may be admitted to either side of the piston as desired, as by means of a valve 25 under control of the operator of the truck.

As shown in Fig. 1, the piston in the cylinder 10 has been operated to raise the container 17 along the track or way into a horizontal plane well above the rear axle of the truck. With the parts in this position, when fluid under pressure is admitted to the right-hand side of the piston in the cylinder 23, the track or way, together with its suspended container, is turned around the shaft 4 from the upright position shown in Fig. 1, to the approximately horizontal position shown in Fig. 2, with the container resting on the track or way 6 well above the rear axle of the truck and with the greater portion thereof well forward of the axle.

It will be apparent, of course, that by having the track or way slightly longer and raising the container somewhat higher than shown in Fig. 1, the container, when the track or way is laid down in the position shown in Fig. 2, may be placed well forward of the rear axle of the truck.

The container may be of any suitable or usual construction with bottom, side or top doors as desired, but as here shown the side 17' of the container is open, and when the container is in the position shown in Fig. 2, this side is the upper side of the container, so that the contents of the container are readily retained therein. This construction is particularly desirable with certain classes of material to be transported, for example, bricks may be readily placed in the container and remain therein as the same is elevated into the position shown in Fig. 1, and when the track and with it the container is let down in the position shown in Fig. 2, the open side 17' is uppermost, and the bricks cannot fall out during transportation. When the truck reaches its destination the track, with the container, is elevated from the position shown in Fig. 2 by admitting fluid under pressure at the left-hand side of the piston in the cylinder 23, whereupon the track, and with it the container, is raised to the position shown in Fig. 1. Thereupon the piston in the cylinder 10 may be moved to lower the container to the ground and the attaching hooks 18 released. By this means the bricks are delivered at their destination without dumpage and without breakage; and they may be removed from the container by workmen, such as hod carriers, etc. When the container is empty the truck that brings one loaded container, sets it on the ground, picks up the empty container and carries it back to the brick kiln.

Preferably the track or way, when in upright position, is inclined slightly forward on the truck, and for the purpose of assuring such slight forward inclination there is provided a stop 25 (Figs. 4 and 5) against which the lower end of the rails of the track abut and limit the rearward movement of the upper portion thereof. This stop can be placed in position to give the track or way, when in upright position, such forward slant or inclined position as may be desired.

It will be seen that by the means described the loaded container may be quickly and readily lifted from the ground and deposited upon the truck above or forward of the rear axle of the truck. Moreover, when the destination of the load has been reached the track or way may be readily raised into an upright position and the container deposited on the ground.

What is claimed is:

1. In a transporting vehicle, the combination of a power shaft extending across the rear end of the vehicle, a track or way pivoted to turn on said power shaft in a vertical plane, means for revolving said power shaft, drums on said shaft exterior to the track and on each side thereof, a second shaft extending across said track above said power shaft with its ends projecting outside of the track or way, guide sheaves on the projecting ends of said second shaft, a container movable up and down on said track or way, cables on said drums and extending over said guide sheaves to said container, and means turning said track or way in a vertical plane on said power shaft.

2. In a transporting vehicle, the combination of a shaft mounted upon and extending across the rear of the vehicle, a track or way mounted on said shaft to turn in a vertical plane, a drum keyed to said shaft intermediate the rails of the track or way, a cable wound on said drum, a power cylinder having a piston rod connected to said cable for revolving said shaft, two additional drums one on each end of said shaft outside of said track or way, a rod extending across said track or way with its ends projecting outside thereof, sheaves one on each end of said rod outside of said track or way, a container, cables wound on the drums on ends of said shaft and passing over said sheaves to said container, a power cylinder pivoted at its forward end on the vehicle and having a piston rod pivotally connected to said track or way.

GEORGE R. DEMPSTER.